Nov. 5, 1968     L. A. IDDINGS     3,408,874

2-AXIS, NONFLOATED BALL BEARING GYROSCOPE

Filed Nov. 18, 1965     2 Sheets-Sheet 1

INVENTOR
LLOYD A. IDDINGS

BY Claude Funkhouser
Stanley N. Garber
ATTORNEY
AGENT

Nov. 5, 1968   L. A. IDDINGS   3,408,874
2-AXIS, NONFLOATED BALL BEARING GYROSCOPE
Filed Nov. 18, 1965   2 Sheets-Sheet 2

United States Patent Office 3,408,874
Patented Nov. 5, 1968

3,408,874
2-AXIS, NONFLOATED BALL BEARING GYROSCOPE
Lloyd A. Iddings, Arlington, Va., assignor to the United States of America as represented by the Secretary of the Navy
Filed Nov. 18, 1965, Ser. No. 508,602
10 Claims. (Cl. 74—5)

ABSTRACT OF THE DISCLOSURE

A self-aligning bearing, especially adapted for use with gyroscopes, in which there is an outer race having a concave surface, and two inner races, each supporting the plurality of ball bearings between the inner and outer races, said inner races being axially movable so as to enable preloading of the bearing races against the balls.

---

The invention described herein may be manufactured and used by or for the Government of the United States of America for governmental purposes without the payment of any royalties thereon or therefor.

The present invention relates to gyroscopes and more particularly to improved gyroscope spin axis bearings.

In the gyroscope field, it has been the general practice to employ a pair of mutally perpendicular gimbal mountings to provide a two axis, three degree of freedom gyroscope. Although such devices have served the purpose, they have not proven entirely satisfactory under all conditions of service since they require considerable space outside of the gyroscope assembly for mountings and since they are unduly complicated. To obviate these shortcomings, the free rotor self centering gyroscope has been developed. This type of gyroscope employs a rotor supported on a spherical ball and socket type bearing which provides three degrees of angular freedom relative to the gyroscope support. Although the free rotor gyroscope has shown a marked operational improvement over the multigimbal gyroscope and has proven to be extremely accurate and error free, the production of the spin axis bearing and bearing seat has required a substantial technological increase in the metallurgy art due to the very close tolerances required. This in turn has necessitated large outlays of capital for precision machinery, thereby greatly increasing the cost of the gyroscope.

The general purpose of this invention, therefore, is to provide a gyroscope which embraces all of the advantages of similarly employed prior art gyroscopes and possesses none of the afore-described disadvantages. To attain this, the present invention utilizes a unique self-centering preloaded spin axis ball bearing assembly which provides three degrees of freedom in a highly rigid gyroscope assembly. Such gyroscopes have many applications, particularly in the aircraft and missile fields. For example, such gyroscopes could be used in the inertial guidance system of a missile for providing guidance error signals to a corrective system on the missile.

Accordingly, an object of the present invention is the provision of a gyroscope having a unique self-centering preloaded spin axis bearing assembly.

Another object is to provide a spin axis bearing for a gyroscope which provides three degrees of freedom about the spin axis thereof.

A further object of the invention is the provision of a self-centering gyroscope spin axis bearing which may be preloaded to any desired degree to maintain a rigid bearing-gyroscope assembly.

Still another object is to provide a gyroscope having a self-centering preloaded spin axis bearing which is characterized by simplicity of construction, low cost and ease of operation and use.

These and other objects and many of the attendant advantages of this invention will be readily appreciated as the same becomes better understood by reference to the following detailed description when considered in connection with the accompanying drawings in which.

Figure 1:
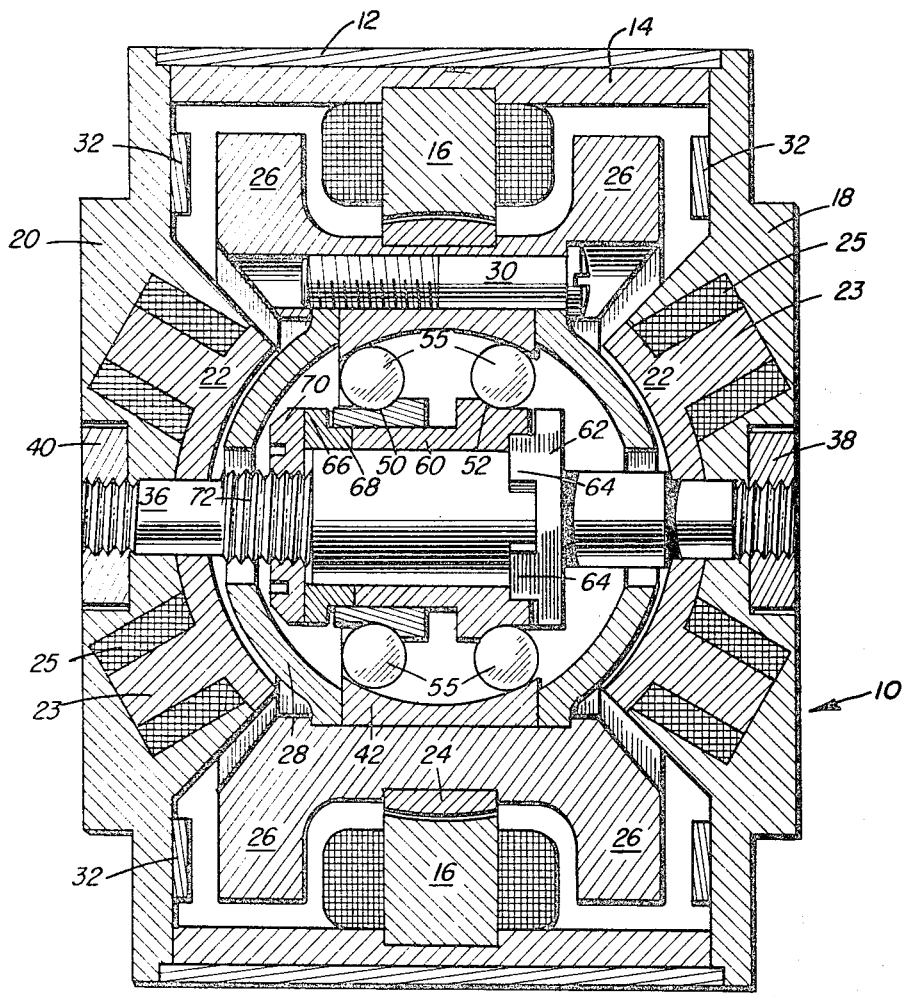
FIG. 1 is a side elevation view, partly in section, of a preferred embodiment of the invention.

Referring now to the drawings wherein like reference characters designate like or corresponding parts thoughout the seveal views, there is shown in FIG. 1 a gyroscope indicated generally by reference character 10. The gyroscope 10 is comprised of a cylindrical outer housing 12 surrounding a cylindrical inner shell 14 having a motor stator 16 secured thereto. The outer assembly is completed by a pair of end plates 18 and 20 containing a plurality of torquer magnets 22, each having a pole piece 23 and a coil 25. A motor rotor 24 is disposed adjacent the motor stator 16 and is secured to a gyrorotor 26. A plurality of torquer sphere segments 28 are secured to the opposite side of the gyro rotor 26 by means of a plurality of bolts 30 and are disposed adjacent each of the torquer magnets 22. In addition, a plurality of capacitor pickups 32 are mounted on the inside wall of the end plates 18 and 20 adjacent the arms of the gyro rotor 26. A spin axis bearing assembly, generally indicated by reference character 34, is mounted on a shaft 36 which is secured to each of the end plates 18 and 20 by a pair of nuts 38 and 40 threadedly engaging the threaded end portions of the shaft 36.

The operation of the above described gyroscope is as follows. The motor stator 16 and rotor 24 are energized and operated in much the same manner as a conventional electric motor thereby causing the gyro rotor 26, to which the motor rotor 24 is secured, to rotate about the shaft 36. Once set in motion, the gyro rotor 26 will rotate about the spin axis thereof in a predetermined set position and will maintain this position in the absence of any disturbing torques applied either directly or indirectly to the gyro rotor 26. Such dsturbing torques, for example, may be caused by a change in direction or acceleration of the aircraft or missle carrying the gyroscope. This torque will cause the rotor 26 to shift on its spin axis bearing 34 thereby providing a signal output at the capacitor pickups 32. The capacitor pickups 32 may be connected to an attitude or velocity correcting system (not shown) and to the electromagnetic coils 25 of the torquer magnets 22. These magnets acting in conjunction with the torquer sphere segments 28 provide a restoring torque to the gyro rotor 26 in a direction opposite to the unbalancing torque, thereby causing the gyro rotor 26 to assume its predetermined initial position.

Figure 2:
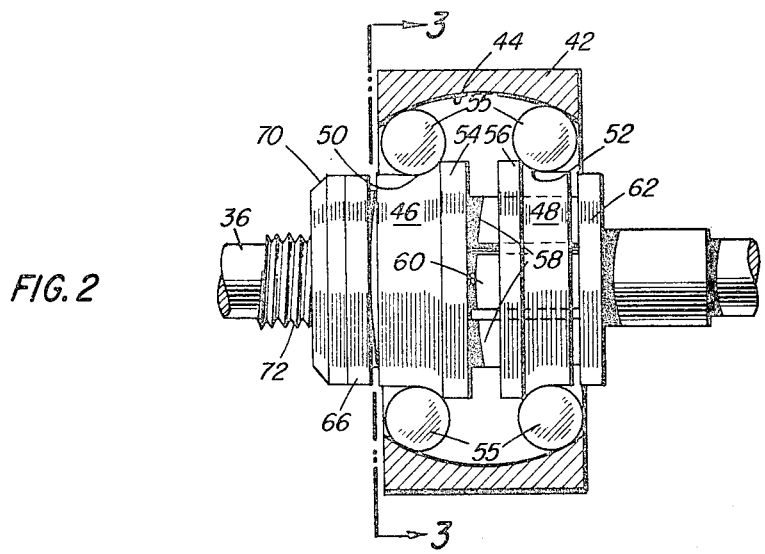
FIG. 2 is a side elevation view, partly in section, of the spin axis bearing assembly.
Figure 3:
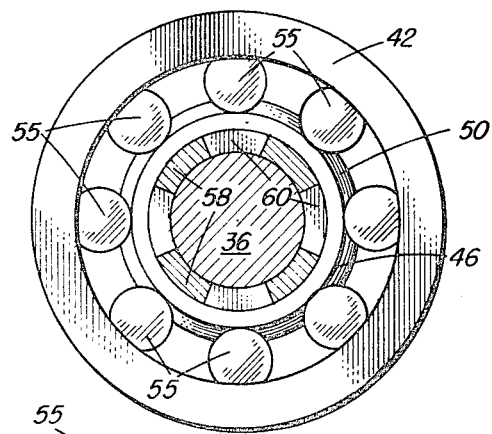
FIG. 3 is a sectional view of the bearing taken on the lines 3—3 of FIG. 2, looking in the direction of the arrows.
Figure 4:
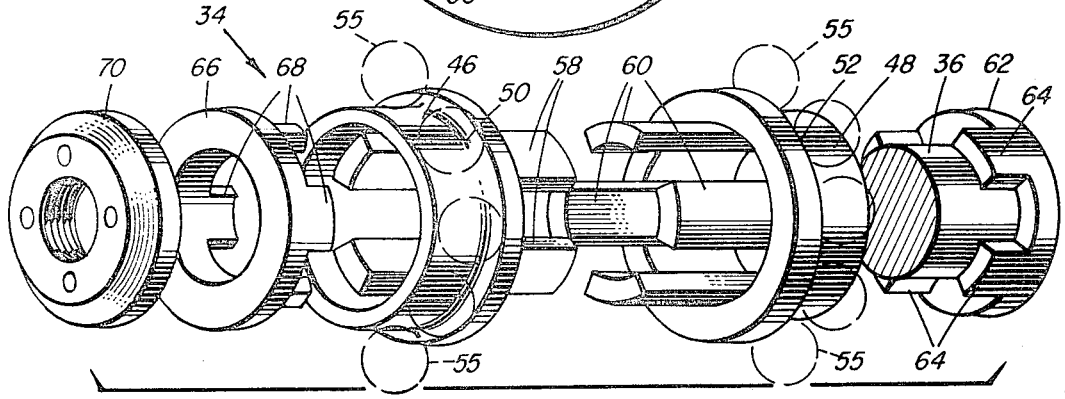
FIG. 4 is an exploded perspective view of the spin axis bearing.

Of primary importance to the present invention is the construction of the spin axis bearing 34. As best illustrated in FIGS. 2, 3 and 4, the bearing 34 is comprised of an annular outer bearing seat 42 having a concave outer race 44. The inner bearing seat is formed of a pair of identical annular members 46, 48, each providing a concave annular bearing race 50, 52 and an annular shoulder 54, 56. A plurality of ball bearings 55 are disposed between the outer race 44 and the inner races 50 and 52.

Secured to the inner face of each of the inner bearing seats 46 and 48 are a plurality of axially projecting arms 58 and 60 which intermesh when the bearing seats are brought together. As shown in FIGS. 2 and 4, one side of the shaft 36 is provided with an integral shoulder 62 having a plurality of axial projections 64 arranged to abut the end faces of the projecting arms 58 on the inner seat 46. The opposite end of the shaft 36 is provided with a washer 66 having a similar number of axial projections 68 arranged to abut the end faces of the projecting arms 60 on the inner seat 48. To complete the inner race assembly, an internally threaded collar 70 is provided for threadedly engaging the threaded portion 72 of the shaft 36.

The spin axis bearing assembly 34 is assembled by inserting the shaft 36 through both of the inner bearing seats 46 and 48 and intermeshing the axially projecting arms 58 and 60. The washer 66 is then slipped over the shaft 36 and the shaft rotated until the projections 64 and 68 abut the end faces of the projecting arms 58 and 60. The threaded collar 70 is then threaded on the threaded portion 72 of the shaft 36 to complete the inner race assembly. The outer race 42 is then slipped over the completed inner race assembly and the ball bearings 55 positioned between the outer race 44 and the inner races 50 and 52. By rotating the collar 70, so as to thread it toward the right of the shaft 36 as viewed in FIG. 2, the projections 68 on the washer 66 are caused to press against the end faces of the projecting arms 60 on the inner race 48, thereby separating the inner races 46 and 48 until a predetermined amount of preload is applied to the ball bearings 55. The threaded collar 70 may then be locked in position by any of several conventional means, such as a cotter key.

The bearing assembly 34 provided by the aforedescribed structure is capable of providing three degrees of motion in a gimbaless structure. Thte assembly, due to the preloading of the spin axis bearing, is extremely rigid thereby eliminating the need for extremely close tolerances as is required in a non-adjustable bearing assembly. This preload feature in combination with the spherical self-centering bearing permits the gyro rotor 26 to rotate 360° on its spin axis and to move approximately plus or minus 10° in a path normal to the spin axis.

It is to be understood, of course, that the foregoing disclosure relates to only a preferred embodiment of the invention and that many modifications or alterations may be made therein without departing from the spirit and scope of the invention as set forth in the appended claims.

What is claimed is:
1. A gyroscope comprising:
an outer housing;
a gyro rotor disposed within said housing;
means to rotate said gyro rotor about a spin axis; and
a spin axis bearing, said bearing being comprised of an outer bearing seat having a concave bearing race, a pair of inner bearing seats, a plurality of ball bearings disposed between said outer seat and each of said inner seats, and means to vary the axial separation between said inner bearing seats, whereby a variable preload may be applied to said bearing.

2. A gyroscope in accordance with claim 1 wherein: said outer bearing seat is comprised of an integral annular bearing member having a concave bearing race on its inner wall.

3. A gyroscope in accordance with claim 2 wherein: each of said inner bearing seats is comprised of an annular bearing member having a concave bearing race on its outer wall, said seats each having a plurality of axially projecting spaced arms secured to the inner wall thereof, the arms on one of said bearing seats being so configured and arranged to intermesh with the arms on the other of said bearing seats.

4. A gyroscope in accordance with claim 3 wherein: said spin axis bearing is mounted for rotation on a shaft, said shaft having annular members disposed therearound at each end of said spin axis bearing, said members having a plurality of axial projections extending therefrom for engaging the ends of said axially projecting spaced arms.

5. A gyroscope in accordance with claim 4 wherein: said shaft is threaded over a portion of its length; and said means for varying the axial separation between said inner bearing seats comprises an internally threaded collar threadedly engaging the threaded portion of said shaft adjacent one of said annular members.

6. A bearing comprising:
an outer bearing seat having a concave bearing race;
a pair of inner bearing seats;
a plurality of ball bearings disposed between said outer seat and each of said inner seats; and
means to vary the axial separation between said inner bearing seats, whereby a variable preload may be applied to said bearing.

7. The bearing of claim 6 wherein said outer bearing seat is comprised of an integral annular bearing member having a concave bearing race on its inner face.

8. The bearing of claim 7 wherein each of said inner bearings seats is comprised of an annular bearing member having a concave bearing race on its outer wall, said seats each having a plurality of axially projecting spaced arms secured to the inner wall thereof, the arms of one of said bearing seats being so configured and arranged to intermesh with the arms on the other of said bearing seats.

9. The bearing of claim 8 wherein said bearing is mounted on a shaft, said shaft having annular members disposed therearound at each end of said bearing, said members having a plurality of axial projections extending therefrom for engaging the ends of said axially projecting spaced arms.

10. The bearing in accordance with claim 9 wherein said shaft is threaded over a portion of its length and said means for varying the axial separation between the inner bearing seats comprises an internally threaded collar, threadedly engaging the threaded portion of said shaft adajecent one of said annular members.

References Cited
UNITED STATES PATENTS

| | | | |
|---|---|---|---|
| 1,399,959 | 12/1921 | Hanson | 308—197 |
| 2,054,581 | 9/1936 | Delaval-Crow | 308—191 X |
| 2,410,002 | 10/1946 | Bach | 74—5 X |
| 2,413,285 | 12/1946 | Bousky | 74—5.7 |
| 2,518,159 | 8/1950 | Martin | 74—5 X |
| 2,978,913 | 4/1961 | Freebairn et al. | 74—5.7 |
| 3,019,662 | 2/1962 | Gahn | 74—5.7 |

C. J. HUSAR, *Primary Examiner.*